United States Patent [19]

Cheng et al.

[11] Patent Number: 4,505,728

[45] Date of Patent: Mar. 19, 1985

[54] VACUUM FREEZING MULTIPLE PHASE TRANSFORMATION PROCESS AND APPARATUS FOR USE THEREIN

[76] Inventors: Chen-Yen Cheng, 9605 La Playa St. NE., Albuquerque, N. Mex. 87111; Sing-Wang Cheng, 8228 Pickard Ct. NE., Albuquerque, N. Mex. 87110

[21] Appl. No.: 526,261

[22] Filed: Aug. 25, 1983

Related U.S. Application Data

[63] Continuation-in-part of Ser. No. 315,858, Oct. 28, 1981, Pat. No. 4,420,318.

[51] Int. Cl.³ .............................................. B01D 9/04
[52] U.S. Cl. ........................................ 62/542; 210/774
[58] Field of Search ................... 62/542, 541; 159/45, 159/DIG. 23, DIG. 16; 55/82; 422/244; 23/294 R; 165/361; 210/737, 774

[56] References Cited

U.S. PATENT DOCUMENTS

| | | | |
|---|---|---|---|
| 3,745,782 | 7/1973 | Heyhart et al. | 210/774 |
| 3,880,756 | 4/1975 | Raineri et al. | 210/774 |
| 4,097,378 | 6/1978 | Clail | 210/774 |
| 4,236,382 | 12/1980 | Cheng et al. | 62/537 |
| 4,252,772 | 2/1981 | Way | 422/244 |

*Primary Examiner*—Hiram H. Bernstein

[57] ABSTRACT

Improved apparatuses and methods of operation for conducting the separation process entitled "Vacuum Freezing Multiple Phase Transformation Process (denoted as VFMPT Process)" have been introduced. Processing zones and valving means are properly arranged so that operations in most processing zones are continuous. An improved VFMPT plant can be operated simply and reliably and be constructed at a low cost. Corrosion problems, use of a low pressure compressor, use of an absorbing solution have been eliminated.

A feed containing a volatile solvent and one or more non-volatile solutes is separated to produce a purified solvent product and a concentrate by the following steps: (a) a feed is flash vaporized in a vacuum freezing zone to form a first vapor and a first condensed mass containing solvent crystals and mother liquor, the pressure of the first vapor being lower than the triple point pressure of the solvent; (b) the first condensed mass is separated into a mass of purified solvent crystals and a concentrate in a crystal washing unit; (c) the first vapor is brought to a liquid state in a vapor liquefaction zone comprising several sub-zones by a two stage transformation involving vapor desublimation and desublimate melting operations; (d) a solvent stream is continuously vaporized in a thin film evaporator within a vapor generation zone to produce a continuous stream of second vapor whose pressure is somewhat higher than the triple point pressure of the solvent, (e) the solvent vapor is brought in contact with the purified solvent crystals to thereby melt the crystals and condense the vapor. The desublimate melting operation may also be accomplished by bringing a part of the second vapor in contact with the desublimate. A unique set of valving means are used to control flows of first and second vapors to the vapor liquefaction sub-zones.

20 Claims, 19 Drawing Figures

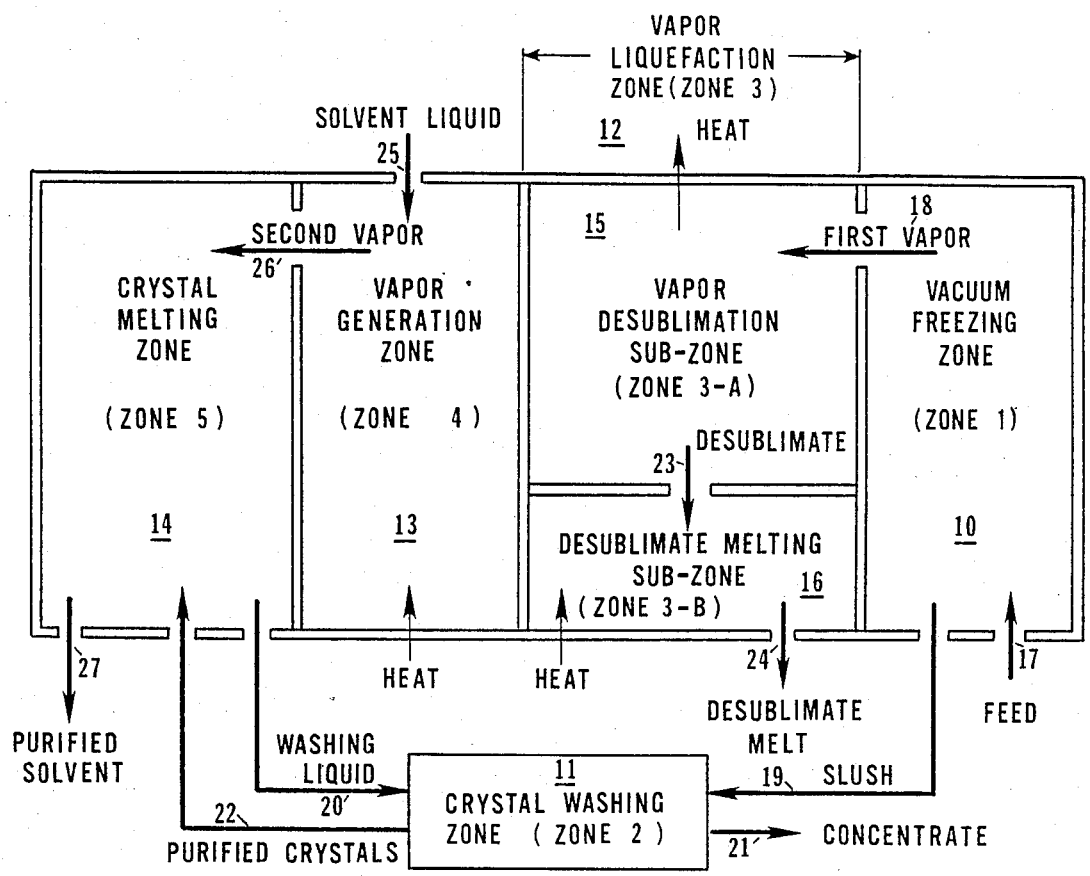
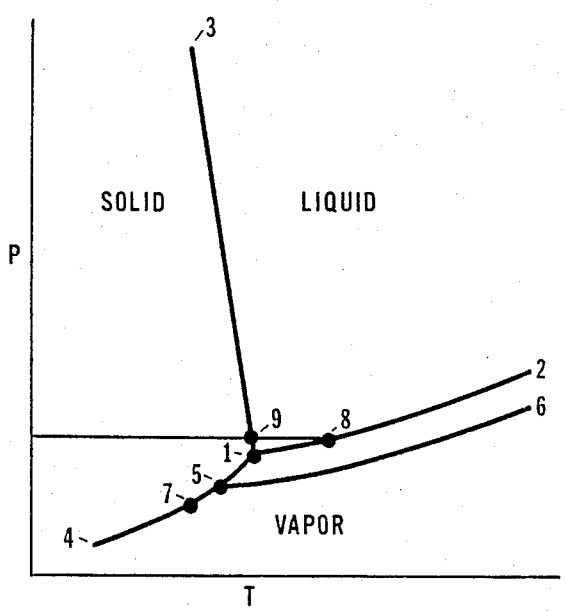
FIGURE 1
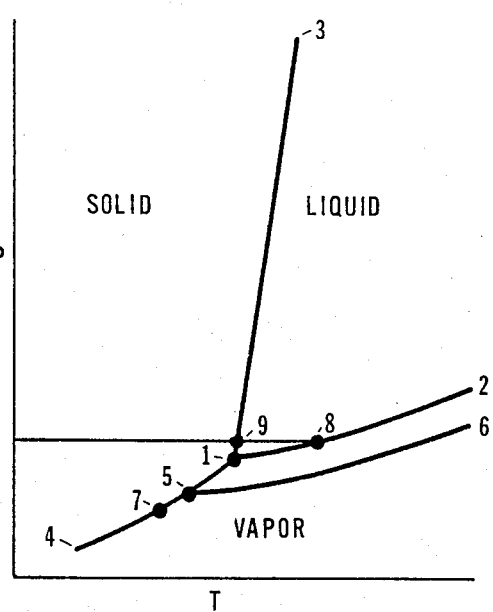
FIGURE 2

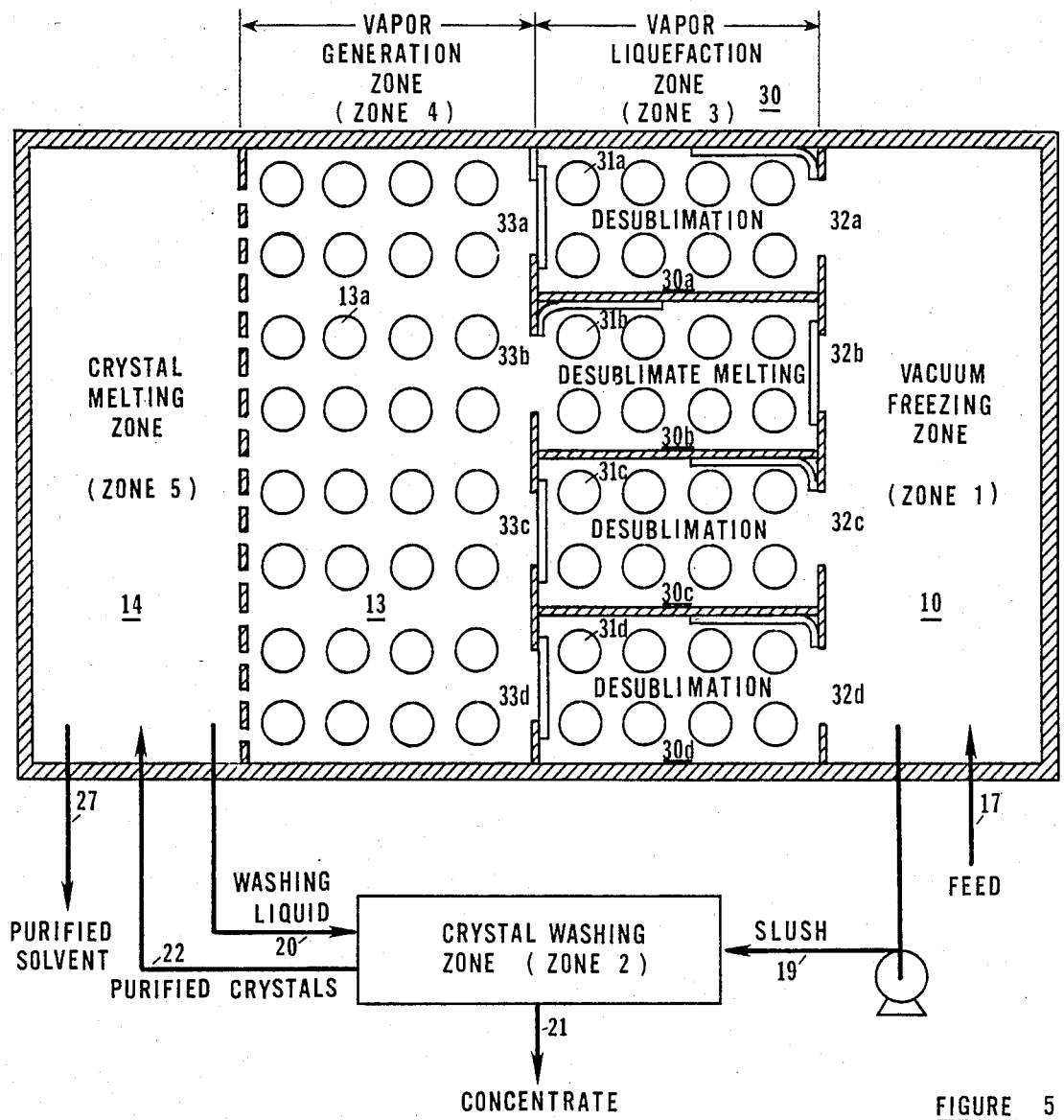
FIGURE 5
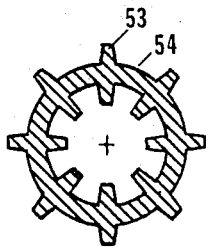
FIGURE 10
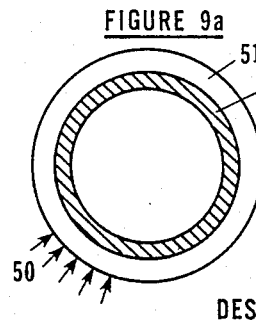
FIGURE 9a  FIGURE 9b
DESUBLIMATE MELTING
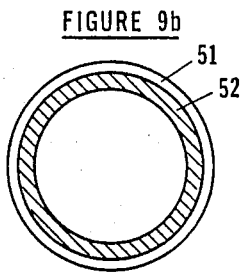
FIGURE 9c
FIGURE 9

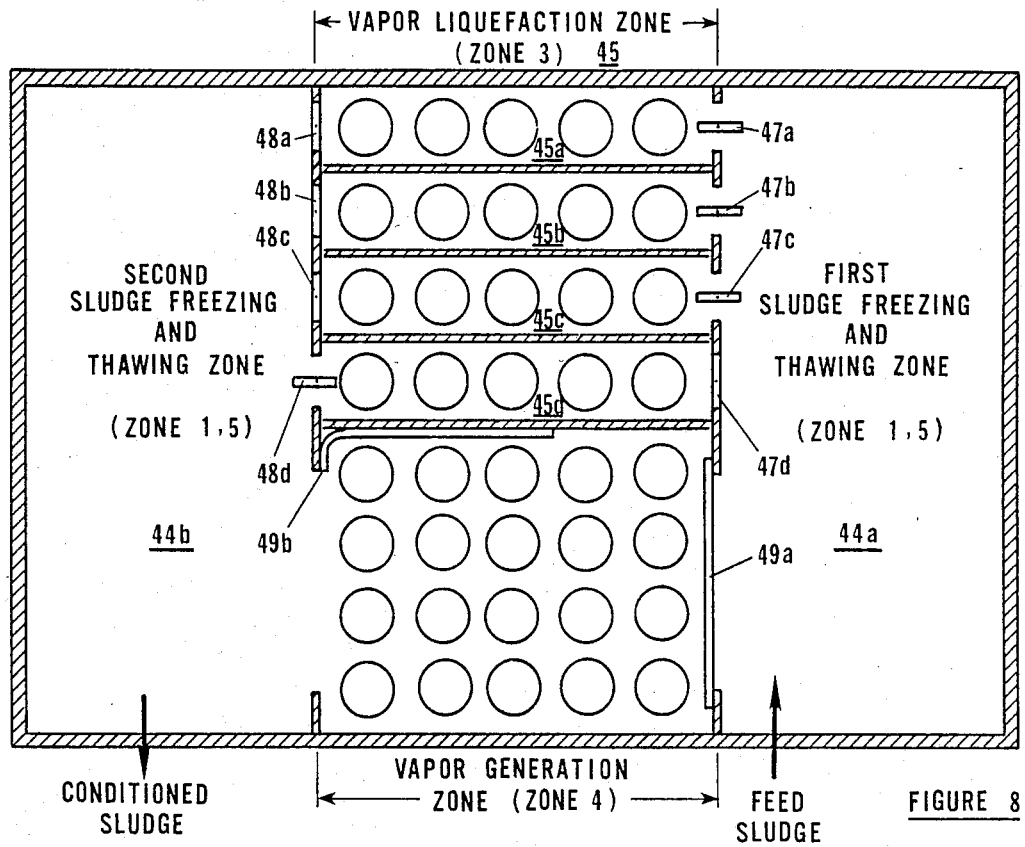
FIGURE 8
VAPOR PROCESSING CONDUIT FOR DESUBLIMATION-MELTING-VAPORIZATION
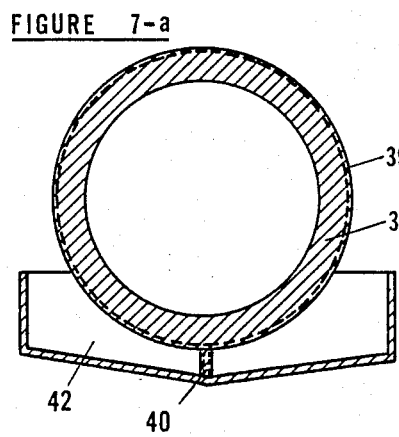
FIGURE 7-a
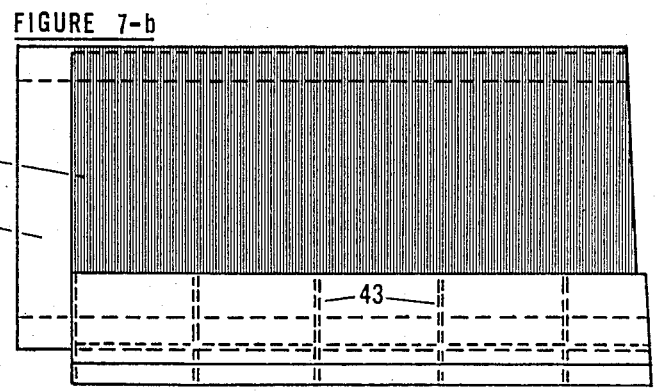
FIGURE 7-b
FIGURE 7

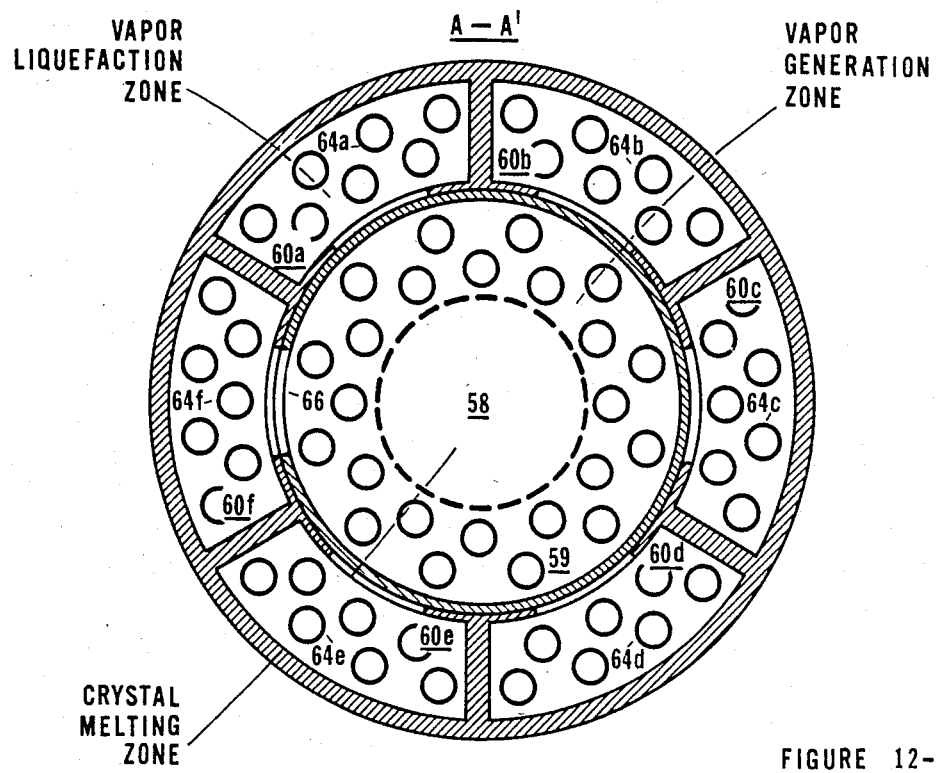
FIGURE 12-a
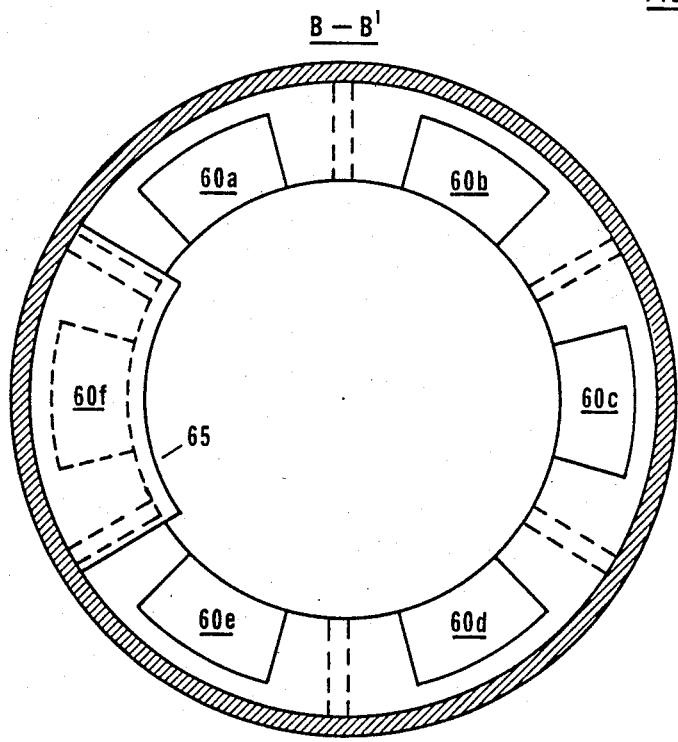
FIGURE 12-b

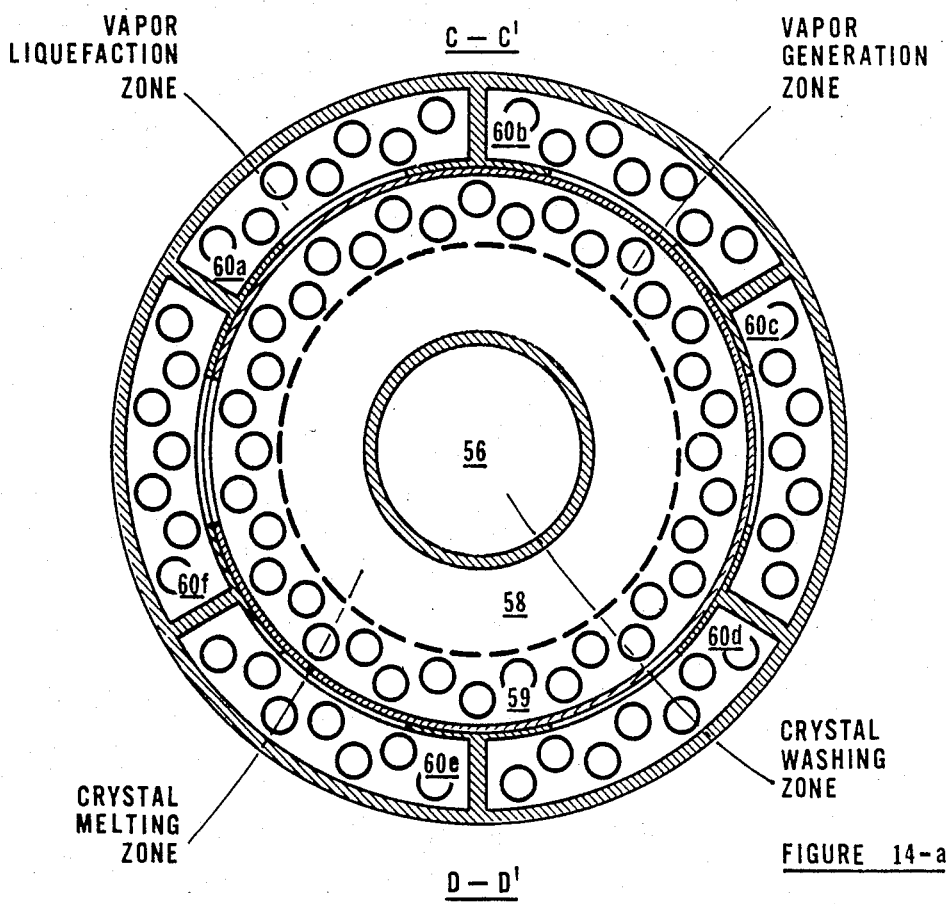
FIGURE 14-a
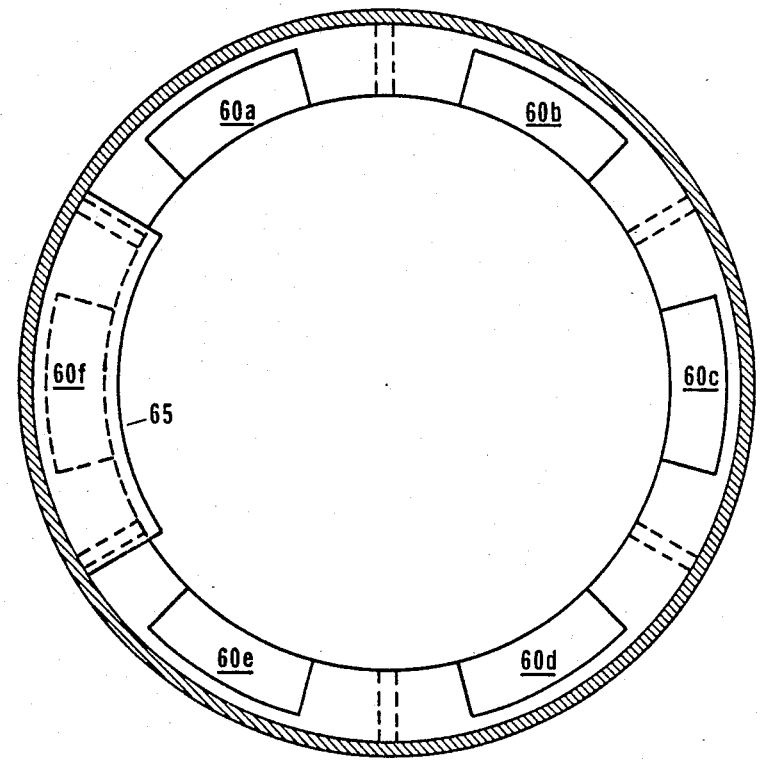
FIGURE 14-b

VACUUM FREEZING MULTIPLE PHASE TRANSFORMATION PROCESS AND APPARATUS FOR USE THEREIN

RELATED APPLICATION

This application is a continuation-in-part application of the Ser. No. 06/315,858 application filed on Oct. 28, 1981, now U.S. Pat. No. 4,420,318, 12/13/83.

BACKGROUND OF THE INVENTION

1. Field of Invention

The process of the present invention is an improved vacuum freezing process that is useful in separating solvent from a solution that contains one or more non-volatile solutes. It can be used in desalination of sea water and brackish water, renovation of waste water, concentration of aqueous and non-aqueous solutions, and conditioning of sludges.

The major difficulties that a conventional vacuum freezing process has suffered from are related to the way the low pressure water vapor formed in a vacuum freezing zone is removed from the zone and the way it is transformed into a liquid state. The present invention introduces a new and convenient method of accomplishing these without using a compressor to compress the vapor, without using an absorbing solution to absorb the vapor and without pressurizing ice. In the process, the low pressure vapor is desublimed without pressurization and the desublimate is then melted. A mass of the solvent is vaporized to form a vapor that is at a pressure higher than the triple point pressure. The process is highly energy efficient and can be operated simply and reliably. Equipment in which these operations can be conveniently conducted has been introduced.

2. Brief Description of the Prior Art

Several vacuum freezing processes have been introduced by workers in the desalination field. These processes are (1) Vacuum-Freezing Vapor-Compression (VFVC) Process developed by Colt Industries, (2) Vacuum-Freezing Vapor Absorption (VFVA) Process developed by Carrier Corporation, (3) Vacuum-Freezing Ejector-Absorption (VFEA) Process developed by Colt Industries, (4) Vacuum-Freezing Solid-Condensation (VFSC) Process developed in the Catholic University of America (5) Absorption Freezing Vapor Compression (AFVC) Process introduced by Concentration Specialists, Inc., and (b) Vacuum Freezing High Pressure Ice Melting (VFPIM) Process introduced by Chen-Yen Cheng and Sing-Wang Cheng.

In any of the vacuum freezing processes described, an aqueous solution is introduced into a chamber which is maintained at a pressure that is somewhat lower than the vapor pressure of the solution at the freezing temperature of the solution to thereby simultaneously flash vaporize water and form ice crystals. As the results of this operation, a low pressure water vapor and an ice-mother liquor slurry are formed. In case of sea water desalination, this pressure is around 3.5 Torr. The low pressure water vapor formed has to be removed and transformed into a condensed state; the ice crystals have to be separated from the mother liquor and the resulting purified ice has to be melted to yield fresh water. Furthermore, the heat released in transforming the vapor into a condensed state has to be utilized in supplying the heat needed in melting the ice. The processes described utilize different ways of vapor removal, different ways of transforming the vapor into condensed states and different ways of accomplishing the heat reuse.

The vacuum Freezing Vapor Compression Process is described in the Office of Saline Water, Research and Development Report No. 295. In the process, the low pressure water vapor is compressed to a pressure higher than the triple point pressure of water (4.58 Torr) and is then brought in direct contact with purified ice to thereby simultaneously condense the water vapor and melt the ice. The main disadvantage of this process is that the special compressor designed to compress the low pressure water vapor can not be operated reliably and the compressor efficiency is low.

The Vacuum Freezing Vapor Absorption Process was developed by Carrier Corporation up to 1964, but has been discontinued. The process is described in the Office of Saline Water, Research and Development Report No. 113. In the Process, the low pressure water vapor is absorbed by a concentrated lithium bromide solution. The diluted solution is reconcentrated by evaporation and the water vapor so formed is condensed to become fresh water. Heat of absorption is removed by a recycling water stream through a heat transfer surface; the recycling water stream is then used to melt the ice crystals.

The Vacuum Freezing Ejector Absorption Process was also developed by Colt Industries and is described in Office of Saline Water, Research and Development Report No. 744. In the process, the low pressure water vapor obtained in the freezing step is compressed by a combination of steam ejector and absorber loop. A concentration sodium hydroxide solution is used to absorb a part of the low pressure vapor, the diluted sodium hydroxide solution is boiled to form water vapor at 300 Torr and regenerate the concentrated solution. In the ejector the water vapor at 300 Torr is used to compress the remaining low pressure water vapor.

The Vacuum-Freezing Solid-Condensation Process was developed by Professors H. M. Curran and C. P. Howard of the Catholic University of America and is described in Office of Saline Water, Research and Development Report No. 511. The process is a batch evaporative freezing process in which saline water is sprayed into a rotating cylindrical basket at a pressure below the triple point pressure. Continuous removal of vapor results in the formation of an annular ice-brine semi-solid layer on the lateral surface of the basket. The brine is removed by washing and the residual ice is melted. The optimum design requires that the freezing, washing, and melting operations be of equal duration. Therefore, the optimum plant consists of three modules, in each of which the freezing, washing, and melting operations occur in succession and out-of-phase with the other two. The heat removed by evaporative freezing in one module is used to melt the washed ice in another module. The main mass of washed ice crystals is melted by being brought into contact with the heated surface.

The Absorption Freezing Vapor Compression (AFVC) Process has been recently introduced by Concentration Specialists, Inc., Andover, Mass. and a 25,000 gpd pilot plant has been built in OWRT (Office of Water Research and Technology) Wrightsville Beach Test Station. The absorption freezing vapor compression (AFVC) Process is a vacuum freezing process in which the freezing is accomplished in a stirred tank crystallizer due to the evaporation of water vapor which in turn is absorbed in an adjacent chamber by a concentrated solution of sodium chloride (NaCl). The NaCl solution, diluted by the water vapor, is pumped to a generator where it is concentrated to its original strength by a vapor compression cycle using a closed circuit refrigerant as the working fluid. The vapor compression cycle operates between the absorber and generator, taking the heat that is associated with absorption and pumping it up to a level such that it can be used to evaporte the absorbate in the generator. The vapor liberated in the generator is used to melt the ice in direct contact.

In the Improved Vacuum-Freezing High Pressure Ice Melting Process of U.S. Pat. No. 4,236,382, an aqueous solution is flash vaporized under a reduced pressure to simultaneously form a low pressure water vapor and ice crystals. The ice formed is first purified in a counter-washer and then melted inside of heat conductive conduits under a high pressure (e.g. 600 atm.) and the low pressure water vapor is desublimed to form desublimate (ice) on the outside of the conduits. The latent heat of desublimation released is utilized in supplying the heat needed in the ice-melting operation. The desublimate is removed intermittently by an in-situ dissolution operation utilizing an aqueous solution such as the feed solution or the concentrate; about an equivalent amount of ice is formed inside of the conduits by an exchange freezing operation. The ice so formed is also melted by the high pressure ice melting operation described.

BRIEF DESCRIPTION OF THE INVENTION

Improved methods and apparatuses for conducting The Vacuum Freezing Multiple Phase Transformation Process (denoted as the VFMPT Process) have been introduced. An improved plant based on the present invention can be constructed at a low cost and can be operated reliably, and most of the processing zones in the plant can be operated continuously. The improved VFMPT Process can be used in separating the solvent from an aqueous solution or a non-aqueous solution containing one or more low volatility solutes. Examples are: desalination of sea water and brackish water; concentration of industrial aqueous solutions, such as sugar solutions, caustic solutions, and acid solutions; separations of solvents from organic solutions, such as those obtained in extraction processes. The process can also be used in conditioning a mixture by freezing and thawing operations, such as in conditioning an aqueous sludge to facilitate dewatering the sludge.

In most applications, a separation process of the present invention comprises the following steps: (a) simultaneous flash vaporization and crystallization to form a first vapor and a mass of solvent crystals, the pressure of the first vapor being lower than the triple point pressure of the solvent, and the crystals and the remaining liquid forming a slush denoted as a first condensed mass (Step 1); (b) separating the first condensed mass into a mass of purified solvent solid and a mother liquor (Step 2); (c) desubliming the first vapor without pressurization to form a mass of desublimate (Step 3a) and melting the desublimate (Step 3-b); (d) vaporizing a mass of solvent to form a second vapor, whose pressure is slightly higher than the triple point pressure (Step 4); (e) contacting the second vapor with the purified solvent crystals to thereby melt the crytals and condense the vapor (Step 5). In an improved operation, the desublimate is also melted by bringing a mass of the second vapor in contact with it. The melts of the desublimate and the solvent crystals and the condensate of the second vapor are purified solvent. Desublimation of the first vapor (Step 3-a) and melting of the desublimate (Step 3-b) are collectively referred to as a two stage transformation of the first vapor or simply as a liquefaction of the first vapor (Step 3).

An improved VFMPT plant comprises a vacuum freezing zone for conducting Step 1, a crystal washing unit for conducting Step 2, a vapor liquefaction zone that comprises several liquefaction sub-zones for conducting Steps 3a and 3b, a vapor generation zone for conducting Step 4 and a crystal melting zone for conducting Step 5. It is convenient to use several vapor-liquefaction sub-zones, each of which is alternately used as a vapor desublimation sub-zone and a desublimate melting sub-zone. The operations in a sub-zone are out-of-phase with those of other sub-zones. The first vapor generated in the vacuum freezing zone can then be continuously removed from the zone, and, thus, the zone can be operated continuously. A thin film evaporator is installed in the vapor generation zone to continuously transform a stream of solvent into a stream of the second vapor, which is used to melt the desublimate and the purified solvent crystals. First and second valving means are used to respectively control the flows of first and second vapors from the vacuum freezing zone and the vapor generation zone into the vapor liquefaction sub-zones. Because of the improvements introduced, an improved VFMPT plant can be constructed at a low cost, and operated continuously and reliably. Controls of the plant operations are greatly simplified. Some designs of improved plants are described in detail.

BRIEF DESCRIPTION OF THE DRAWINGS

The improved VFMPT Process can be used in concentrating both aqueous and non-aqueous solutions, and in conditioning sludges.

FIG. 1 illustrates the phase behaviors of water and an aqueous solution and illustrates conditions under which the steps of processing the aqueous solution are conducted.

FIG. 2 illustrates the phase behaviors of a non-aqueous solvent and a non-aqueous solution and illustrates conditions under which the steps of processing the non-aqueous solution are conducted.

FIG. 3 illustrates a general system of arranging various processing zones in a plant in which the VFMPT Process may be conducted. The system comprises a vacuum freezing zone (Zone 1), a crystal washing zone (Zone 2), a vapor liquefaction zone (Zone 3), a vapor generation zone (Zone 4), and a crystal melting zone (Zone 5). The vapor liquefaction zone (Zone 3) comprises sub-zones in which the first vapor generated in the vacuum freezing zone is desublimed and the desublimate is melted. A sub-zone in which vapor desublimation takes place may be referred to as a desublimation sub-zone (Zone 3A); a sub-zone in which desublimate melting takes place may be referred to as a desublimate melting sub-zone (Zone 3B). By removing the first vapor continuously, the operation in the vacuum freezing zone is conducted continuously. There is a thin film evaporator in the vapor generation zone by which a solvent stream is continuously transformed into a second vapor whose pressure is somewhat higher than the triple point pressure of the solvent. The second vapor is used to melt both the desublimate and the purified crystals. The zones and sub-zones illustrated in the general system of FIG. 3 may be combined in various ways.

FIG. 5 illustrates a system of processing zones having several vapor liquefaction sub-zones, each of which is alternately used as a desublimation sub-zone and a desublimate melting sub-zone.

FIG. 7 illustrates the construction of a vapor processing conduit that may be used in a vapor processing sub-zone of FIG. 6.

FIG. 8 illustrates yet another system of arranging zones that can be used conveniently for conditioning sludges. The system comprises one or more sludge freezing and thawing zones, a vapor generation zone and a vapor liquefaction zone having several sub-zones. Each of the vapor liquefaction sub-zone is alternately used as a desublimation sub-zone and a desublimate-melting sub-zone.

FIGS. 9a–9c illustrates the progress of a desublimate melting step when the melting is accomplished by bringing second vapor in contact with the desublimate.

FIG. 10 illustrates a cross section of a metal tube provided with internal and external fins. This type of metal tubes may be used in constructing a vertical thin film evaporator to be used within a vapor generation zones. Of the various systems of arranging processing zones and sub-zones, the system illustrated by FIG. 5 has many advantages.

FIGS. 12-a and 12-b show two cross sections of the main processing unit illustrated in FIG. 11.

FIGS. 14-a and 14-b show two cross sections of the main processing unit illustrated in FIG. 13.

DESCRIPTION OF PREFERRED EMBODIMENT OF THE INVENTION

Figure 4:
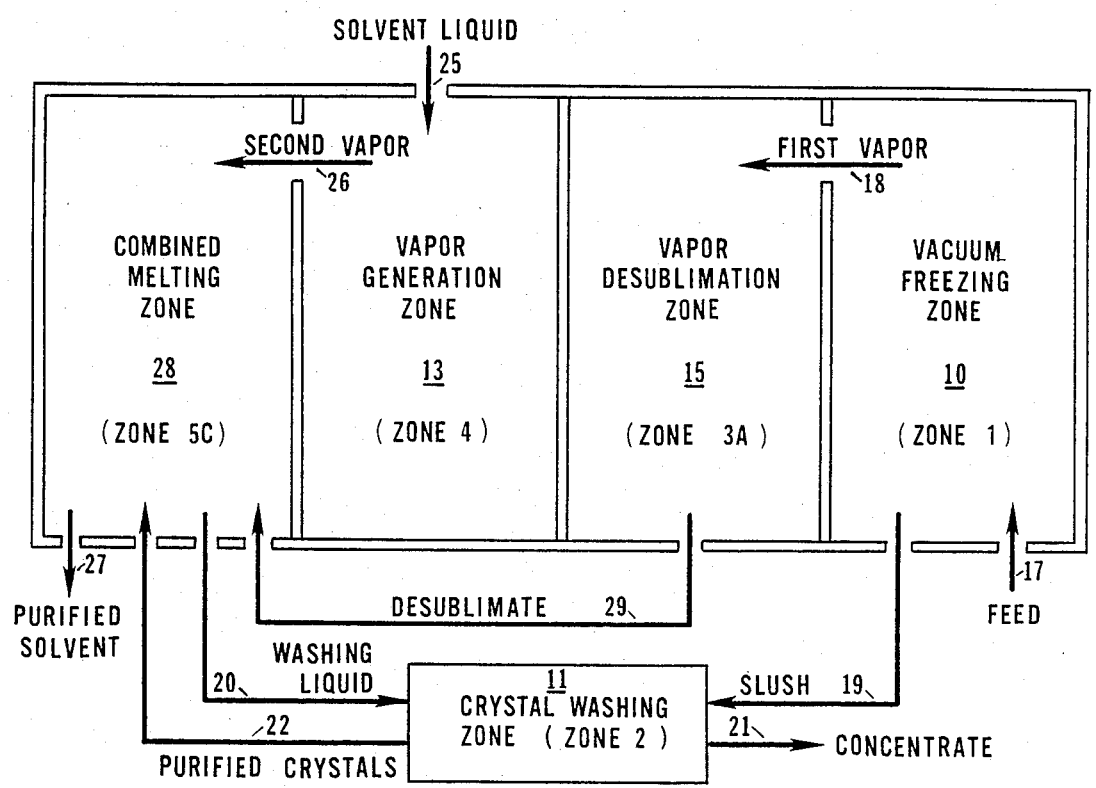
FIG. 4 illustrates a system of processing zones in which both the desublimate and the purified crystals are melted by the second vapor in a combined or integrated zone that may be referred to as a combined melting zone (Zone 5C).

Improved operational procedures, improved systems of arranging processing zones and sub-zones, unique valving means for controlling vapor flows among zones, and improved plant designs have been introduced to the Vacuum Freezing Multiple Phase Transformation Process (denoted as the VFMPT Process). Due to the improvements introduced, most of the processing zones are operated continuously and all processing steps are conducted at high rates. Therefore, plant construction has been greatly simplified, plant cost has been greatly reduced, and plant operation and controls have been greatly simplified. An improved VFMPT plant can be operated reliably.

The VFMPT Process is used to separate a mixture containing a volatile solvent and one or more low volatility solutes into a solvent rich portion and a solvent lean portion and is also used simply to condition a mixture such as a sludge by freezing and thawing operations. In the process, a feed mixture is flash vaporized under a reduced pressure to simultaneously form solvent crystals. The feed is thereby transformed into a solvent enriched vapor (first vapor) whose pressure is lower than the triple point pressure of the solvent and a first condensed mass that contains the solvent crystals. The process incorporates a unique way of transforming the first vapor to a mass of purified solvent liquid and generating a second vapor stream from a mass of pure solvent liquid, the pressure of the second vapor being somewhat higher than the triple point pressure of the solvent. The second vapor is then brought in contact with the solvent crystals to thereby condense the vapor and melt the crystals. In an improved plant, the vacuum freezing step, the second vapor generation step, and the crystal melting step are operated continuously, and the second vapor is used to melt both the desublimate and the crystals.

There are two types of applications for the VFMPT Process. Type 1 processes are used in separation of mixtures such as in desalination of sea water and brackish water; concentrations of industrial aqueous solutions, such as sugar solutions, caustic solutions and acid solutions; separations of organic solutions, such as those obtained in extraction processes. Type 2 processes are used in conditioning of mixtures by freezing and thawing operations, such as in conditioning of gels and sludges to facilitate dewatering. In a Type 1 process, there is a step of separating the first condensed mass into purified solvent crystals and mother liquor (i.e. concentrate); in a Type 2 process, the step described is omitted.

A Type 1 process comprises the following five steps:

STEP 1

Vacuum Freezing

A feed mixture is flash vaporized under a reduced pressure to simultaneously form solvent crystals. The feed mixture is thereby transformed into a first vapor and a first condensed mass that contains the solvent crystals and remaining liquid. The pressure of the first vapor is lower than the triple point pressure of the solvent.

STEP 2

Crystal Washing

The first condensed mass obtained in Step 1 is separated and washed to give a mass of purified solvent crystals and a mother liquor. The mother liquor is heat exchanged and becomes a product (concentrate).

STEP 3

Vapor Liquefaction

The first vapor formed in Step 1 is transformed into a mass of solvent liquid by a two stage transformation, Steps 3A and 3B, as follows:

STEP 3A

Vapor Desublimation

The first vapor formed in Step 1 is cooled without a substantial pressurization by passing a cooling medium through a heat exchanger. Since the vapor is substantially pure solvent and since the pressure is lower than the triple point pressure of the solvent, it desublimes to form a mass of desublimate on the heat exchanger surface.

STEP 3B

Desublimate Melting

The desublimate formed on the heat exchanger surface in Step 3A may either be melted in-situ or be scraped off and melted. One way to accomplish the in-situ melting operation is to pass a heating medium through the heat exchanger; another way is to bring a part of the second vapor formed in Step 4 in contact with the desublimate. When the desublimate is scraped off of the heat exchange surface, it may be melted with the solvent crystals from Step 2 in the crystal melting step (Step 5) to be described.

STEP 4

Vapor Generation

A mass of solvent liquid is vaporized at a temperature somewhat higher than the triple point temperature of the solvent to generate a second vapor whose pressure is somewhat higher than the triple point pressure of the solvent. A thin film evaporator may be used for this vapor generation operation. In processing an aqueous solution, the pressure of the second vapor is around 5.5 torr, which is slightly higher than the triple point pressure of water, 4.58 torr.

STEP 5

Crystal Melting

In this step, the second vapor formed in Step 4 is brought in contact with the purified solvent crystals obtained in Step 2. Since the pressure of the second vapor is higher than the triple point pressure of the solvent, it condenses at a temperature higher than the triple point temperature and melts the solvent crystals. Both the condensate and the melt become purified solvent. When the desublimate formed in Step 3A is scraped off from the heat exchanger, it may also be melted in this step.

In a Type 2 process, Step 2 described is omitted and, in Step 5, the second vapor is contacted with the first condensed mass obtained in Step 1 to thereby condense the vapor and thaw the first condensed mass.

The operating conditions for the steps described are explained by referring to the phase diagrams illustrated by FIGS. 1 and 2. FIG. 1 illustrates the phase behaviors of water and an aqueous solution. It shows the triple point of water 1 (0.01° C., 4.58 Torr.), vaporization line 1-2, melting line 1-3 and sublimation line 1-4. The vapor pressure line of an aqueous solution containing one or more nonvolatile solutes is shown by line 5-6. The three phase point representing the condition under which three phases, ice, water vapor and the aqueous solution, co-exit and attain equilibrium is shown as point 5. Let the concentration of the solution in the freezer be such that its vapor pressure curve be represented by line 5-6, then the first vapor leaving the vacuum freezing zone is at a pressure somewhat lower than the pressure at the three phase point 5. This vapor then enters one or more vapor desublimation sub-zones and is cooled and becomes desublimate on the heat exchanger surfaces at a pressure 7 which is lower than that of the three phase pressure 5. A mass of solvent liquid is vaporized to form the second vapor 8 whose pressure is slightly higher than the triple point pressure 1 of the solvent. The melting temperature of purified solvent crystals is represented by point 9. When the second vapor is brought in contact with the solvent crystals, heat transfers from the vapor to the solid so that condensation of the vapor and melting of solid take place simultaneously. Both the melt and the condensate become product fresh water. The desublimate may also be melted by the second vapor under a condition similar to that described for melting the purified solvent crystals. FIG. 2 illustrates the phase behaviors of a nonaqueous solvent and a solution of the solvent and one or more low volatility solutes. The operational steps used in separating a nonaqueous solution are similar to those described for the aqueous solution. Therefore, a description of them is omitted.

FIG. 3 illustrates a general system for arranging processing zones and sub-zones for conducting the VFMPT Process. The system comprises a vacuum freezing zone 10 (Zone 1), a crystal washing zone 11 (Zone 2), a vapor liquefaction zone 12 (Zone 3), a vapor generation zone 13 (Zone 4), and a crystal melting zone 14 (Zone 5). The vapor liquefaction zone comprises one or more vapor desublimation sub-zones 15 (Zone 3A) and one or more desublimate melting sub-zones 16 (Zone 3B). The function performed in the vapor liquefaction zone is to continuously remove the first vapor generated in the vacuum freezing zone and transform it into solvent liquid; the function performed in the vapor generation zone is to supply second vapor for melting the desublimate and solvent crystals.

FIG. 3 shows that, in a type 1 application, a feed 17 that has been precooled to near its freezing temperature is fed into a vacuum freezing zone 10 (Zone 1). The feed is subjected to a vacuum freezing operation to simultaneously form a first vapor 18 and solvent crystals. The crystals and mother liquor form a slush 19. The slush is sent to the crystal washing unit 11, wherein it is washed with wash liquor 20 and separated into a concentrate stream 21 and a mass of purified crystals 22. The concentrate is heat exchanged with feed and removed as a product. The first vapor 18 is introduced into one or more vapor desublimation sub-zone 15 (Zone 3A) and is cooled by the heat exchanger therein to become a mass of desublimate 23. The desublimate is melted in a desublimate melting sub-zone 16 (Zone 3B) to become a mass of desublimate melt 24, which is purified solvent. A mass of solvent liquid 25 from any source is introduced in the vapor generation sub-zone 13 (Zone 4) and evaporated by a thin film evaporator therein to form a second vapor 26. The desublimate melt obtained in Zone 3B may be used as the mass of solvent in this operation. The second vapor and the purified crystals 22 are brought in contact in the crystal melting zone 14 and both the condensate and the melt become purified solvent 27. The purified solvent may be heat exchanged with the feed and become a purified solvent product. A part of the second vapor may also be brought in contact with the desublimate to thereby melt the desublimate and condense the vapor in the desublimate melting operation.

The system illustrated in FIG. 3 may also be used in Type 2 processes. In such an application, a feed 17 mixture is flash vaporized so that the first condensed mass becomes a substantially completely frozen mass 19. The frozen mass is transferred to the crystal melting zone 14 and melted therein to become a conditioned sludge 27. A mass of liquid is separated from the conditioned sludge by a filtration operation. In this application, the crystal washing operation is omitted and the crystal washing zone 11 is not needed. Other operations are similar to those of the Type 1 application. Similar statements may be applied to modified systems illustrated in FIGS. 4, 5 and 6, and plants illustrated by FIGS. 11 and 13.

The system illustrated by FIG. 3 can be operated in a continuous or a substantially continuous manner: the crystal washing unit can be operated continuously; the operation in the vapor generation zone may be conducted continuously to make a continuous supply of the second vapor; with the continuous supply of solvent vapor, the crystal melting operation can be operated continuously; with a continuous removal of the first vapor, the vacuum freezing operation can be conducted in a continuous manner. The first vapor can be removed continuously either by using a vapor desublimation zone equipped with a continuous means of desublimate removal or using more than one vapor liquefaction sub-zones, in each of which vapor desublimation and desublimate melting operations are alternately conducted and the operations in the sub-zone are operated out-of-phase from the operations conducted in other sub-zones.

The general system illustrated in FIG. 3 may be modified by combining some zones and sub-zones together. Some modified systems are illustrated by FIGS. 4, 5, 6 and 8.

In the system illustrated by FIG. 4, the crystal melting zone 14 and the desublimate melting sub-zone 16 of FIG. 3 are combined and become a combined melting zone (Zone 5 C). The system, therefore, comprises a vacuum freezing zone 10, a crystal washing zone 11, a vapor desublimation zone 15, a vapor generation zone 13, and a combined melting zone 28 (Zone 5 C). In using the system, the desublimate 29 formed in the desublimation zone has to be removed from the zone and be transported to the combined melting zone. One may use a scraped surface heat exchanger to continually remove the desublimate or one may also bring a refrigerated immiscible medium in contact with the first vapor to thereby desublime the vapor. In the latter case, the desublimate formed is suspended in the immiscible medium. The desublimate is separated from the medium and transported to the combined melting zone. Otherwise, the operations in this system are similar to the operations of the system of FIG. 3. This system may also be applied for a Type 2 process by introducing the minor modifications described in connection with the general system of FIG. 3.

FIG. 5 illustrates another modified system of the general system illustrated in FIG. 3. A VFMPT plant having processing zones and sub-zones arranged according to the plan of this system has many advantages: operations in most zones can be conducted continuously; the plant can be constructed at a low cost; the plant can be operated reliably. Designs of practical plants according to the zone arrangement of this system are described later by referring to FIGS. 11 through 14. The system comprises a vacuum freezing zone 10 (Zone 1), a crystal washing zone 11 (Zone 2), a vapor liquefaction zone 30 (Zone 3) comprising several sub-zones 30a, 30b, 30c, 30d, a vapor generation Zone 13, and a crystal melting Zone 14. Each vapor liquefaction sub-zone is alternately used as a vapor desublimation sub-zone and a desublimate-melting sub-zone. At the condition illustrated in FIG. 5, desublimation of the first vapor takes place in three sub-zones 30a, 30c, 30d, and desublimate melting takes place in one sub-zone 30b. It is noted that desublimate melting is accomplished by bringing the second vapor in contact with the desublimate. These sub-zones are provided with heat exchangers 31a, 31b, 31c, 31d, first valving means 32a, 32b, 32c, 32d which control flow of the first vapor into these sub-zones and second valving means 33a, 33b, 33c, 33d which control flow of the second vapor into these sub-zones. These valving means are also used to pressure isolate these sub-zones from the vacuum freezing zone and the vapor generation zone. When a sub-zone is used as a desublimation sub-zone, its first and second valving means are respectively open and closed and cooling medium is passed through the heat exchanger. A mass of the first vapor enters the sub-zone and is thereby desublimed and form a mass of desublimate on the heat exchanger. After a period of this operation, the sub-zone is used as a desublimate melting sub-zone in order to melt the desublimate accumulated on the heat exchanger surface. In this transition, the flow of cooling medium is first stopped, the first valving means is then closed, and then the second valving means is open. The second vapor then enters the sub-zone and melts the desublimate. Other operations are similar to those described earlier by referring to FIG. 3. This system may also be used in a Type 2 application by introducing the minor modifications described in connection with the general system of FIG. 3.

Figure 6:
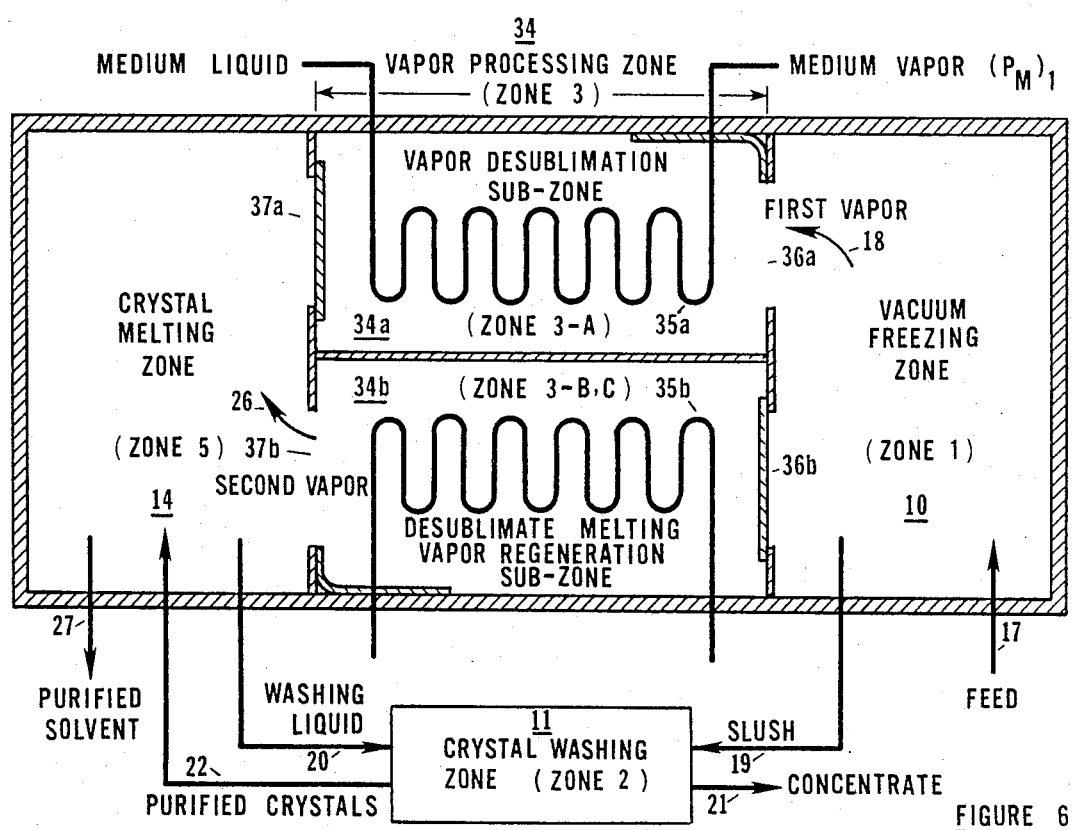
FIG. 6 illustrates the system that has been described in detail in the parent application. In the system, there is a vapor processing zone in which both the functions of the vapor liquefaction zone and the vapor generation zone of FIG. 3 are performed. There are several vapor processing sub-zones, each of which is cyclically used as a vapor-desublimation sub-zone, a desublimate-melting sub-zone and a vapor generation sub-zone. The systems of arranging processing zones illustrated by FIGS. 3, 4, 5, 6 may be used for solvent separation processes and freezing-thawing conditioning processes.

The system illustrated by FIG. 6 shows another modification of the general system of FIG. 3. This system has been described in great detail in the Ser. No. 06/315,858 application, the parent application of the present invention. The system comprises a vacuum freezing zone 10 (Zone 1), a crystal washing zone 11 (Zone 2), a vapor processing zone 34 (Zone 3), and a crystal melting zone 14 (Zone 5). There are several sub-zones 34a, 34b (two are shown in the Figure) in the vapor processing zone. Each of these sub-zone is cyclically used as a vapor desublimation sub-zone, a desublimate melting sub-zone and a vapor generation sub-zone. These sub-zones have heat exchangers 35a, 35b, first valving means 36a, 36b connecting the sub-zones to the vacuum freezing zone and second valving means 37a, 37b connecting the sub-zones to the crystal melting zone. The operations conducted in the first sub-zone 34a are as follows:

(1) Vapor Desublimation Step (Step 3A)

FIG. 6 shows that, during this step, gate 37a is closed and gate 36a is open to allow the first vapor formed in Zone 1 to enter the sub-zone and isolate the sub-zone from Zone 5. A cooling medium liquid is introduced into the heat exchanger 35a to thereby cool the first vapor and form a mass of desublimate on the heat exchanger.

(2) Desublimate Melting Step (Step 3B)

Desublimate melting may be accomplished by (1) heating the desublimate through the heat exchanger, or (2) by bringing a solvent vapor of a proper pressure in contact with the desublimate. In the former case, both gates 36a and 37a are closed and a heating medium is introduced into the heat exchanger 35a to thereby melt the desublimate and form a melt. The melt is kept near the heat exchanger. As the desublimate melts, the pressure in the zone rises to or above the triple point pressure of the solvent. Therefore, gate 36a has to be closed to prevent solvent vapor from flowing from the sub-zone to Zone 1. When both gates 36a and 37a are closed, the sub-zone is isolated and the pressure tends to rise above the triple point pressure of the solvent. This pressure rise increases the rate of melting the desublimate. In the latter case, gate 36a is closed and gate 37a is open to allow a part of the second vapor generated in other sub-zones to enter this sub-zone and melt the desublimate therein. The two methods described may be combined so that the desublimate is melted both by heating through the heat exchanger and by contacting with the second vapor.

(3) Vapor Generation Step (Step 4)

During this step, gate 37a is open and gate 36a is closed and a heating medium is pass through the heat exchanger 35a to thereby vaporize a mass of solvent liquid. The solvent may be supplied to the outer walls of the heat exchanger by a wicking mechanism or a pumping operation. The solvent is thereby transformed into a second vapor whose pressure is higher than the triple point pressure of the solvent. The second vapor enters the crystal melting zone to be condensed and melts the solvent crystals therein. The operations conducted in other vapor processing sub-zones are similar to what have been described. Again, this system may also be used in a Type 2 application by introducing the minor modifications described in connection with the general system of FIG. 3.

It is noted that, in a system of FIG. 6, generation of the second vapor in each vapor generation sub-zone is conducted intermittently. It is also noted that, in this system, it is convenient to use an integrated vapor procesing conduit that it provided with a melt storage near the conduit and a wick structure for feeding the melt on the outer wall during the solvent vaporization step. Such an integrated conduit is illustrated by FIGS. 7-a and 7-b. FIG. 7-a and FIG. 7-b respectively illustrate a radial cross section and a side view of an integrated vapor processing conduit. It comprises a conduit 38 provided with wicking structures 39, 40 and a melt storage trough 41 tht stores the melt 42. The region between the conduit and the trough may be separated into conpartments by partitions 43. A thin layer of melt is maintained on the outer wall of the conduit during melting and vaporization steps by the action of the wicking structure. Many types of wick structures and many materials have been used in manufacturing heat pipes. Such structures and materials are described in books on heat pipes, such as "Heat Pipe Theory and Practice", written by S. W. Chi and Published by Mc Graw-Hill Company and "Heat Pipes" written by P. Dunn and D. A. Reay and published by Pergamon Press. Wick structures and materials used in heat pipes can be used in the manufacture of integrated vapor processing conduits. The purpose of the wick structure in a vapor processing conduit are threefold: (1) to provide the necessary flow passages for transferring melt from the storage to all over the outer wall of the conduit, (ii) to provide surface pores at the liquid-vapor interface for the development of capillary pumping pressure, and (iii) to provide a heat flow path from the outer wall to the liquid-vapor interface. Some examples of wick structures are wrapped screen, sintered metal, circumferential grooves, screen covered circumferential grooves, and fabric and paper.

The system illustrated by FIG. 8 shows yet another modification of the general system of FIG. 3. A plant of this type can be used for conditioning sludges. The system comprises one or more freezing-thawing zones 44a, 44b, a vapor liquefaction zone 45, a vapor generation zone 46. In this system, there is no crystal washing zone. Each of the freezing-thawing zone is alternately used as a vacuum freezing zone and a crystal thawing zone. The vapor liquefaction zone 45 comprises several sub-zones 45a, 45b, 45c, 45d, each of which is used alternately as a vapor desublimation sub-zone and a desublimate-melting sub-zone. The operations in these sub-zones are conducted out-of-phase.

Under the condition illustrated in FIG. 8, a sludge is subjected to a vacuum freezing operation in the first freezing-thawing zone 44a and frozen sludge is thawed in the second freezing-thawing zone 44b. The functions of these two zones are alternated cyclically. The first vapor that is alternately generated in the two freezing-thawing zones is introduced into the vapor liquefaction sub-zones and the resulting desublimate is melted in the sub-zones. Second vapor is generated continuously in the vapor generation zone 46 and is alternately introduced into the first and second freezing-thawing zones to melt the crystals therein. The vapor liquefaction sub-zones 45a, 45b, 45c, 45d are provided with first valving means 47a, 47b, 47c 47d and second valving means 48a, 48b, 48c, 48d to control the flows of the first and second vapors into the sub-zones. By alternative actuations of these valves, desublimation of the first vapor and melting of the desublimate take place alternatively in each of the sub-zones. The flow of the second vapor into the two freezing-thawing zones is controlled by two gates 49a, 49b.

The operations conducted in the first sub-zone 45a are as follows:

sub-zones 34a, 34b (two are shown in the Figure) in the vapor processing zone. Each of these sub-zone is cyclically used as a vapor desublimation sub-zone, a desublimate melting sub-zone and a vapor generation sub-zone. These sub-zones have heat exchangers 35a, 35b, first valving means 36a, 36b connecting the sub-zones to the vacuum freezing zone and second valving means 37a, 37b connecting the sub-zones to the crystal melting zone. The operations conducted in the first sub-zone 34a are as follows:

(1) Vapor Desublimation Step (Step 3A)

FIG. 6 shows that, during this step, gate 37a is closed and gate 36a is open to allow the first vapor formed in Zone 1 to enter the sub-zone and isolate the sub-zone from Zone 5. A cooling medium liquid is introduced into the heat exchanger 35a to thereby cool the first vapor and form a mass of desublimate on the heat exchanger.

(2) Desublimate Melting Step (Step 3B)

Desublimate melting may be accomplished by (1) heating the desublimate through the heat exchanger, or (2) by bringing a solvent vapor of a proper pressure in contact with the desublimate. In the former case, both gates 36a and 37a are closed and a heating medium is introduced into the heat exchanger 35a to thereby melt the desublimate and form a melt. The melt is kept near the heat exchanger. As the desublimate melts, the pressure in the zone rises to or above the triple point pressure of the solvent. Therefore, gate 36a has to be closed to prevent solvent vapor from flowing from the sub-zone to Zone 1. When both gates 36a and 37a are closed, the sub-zone is isolated and the pressure tends to rise above the triple point pressure of the solvent. This pressure rise increases the rate of melting the desublimate. In the latter case, gate 36a is closed and gate 37a is open to allow a part of the second vapor generated in other sub-zones to enter this sub-zone and melt the desublimate therein. The two methods described may be combined so that the desublimate is melted both by heating through the heat exchanger and by contacting with the second vapor.

(3) Vapor Generation Step (Step 4)

During this step, gate 37a is open and gate 36a is closed and a heating medium is pass through the heat exchanger 35a to thereby vaporize a mass of solvent liquid. The solvent may be supplied to the outer walls of the heat exchanger by a wicking mechanism or a pumping operation. The solvent is thereby transformed into a second vapor whose pressure is higher than the triple point pressure of the solvent. The second vapor enters the crystal melting zone to be condensed and melts the solvent crystals therein. The operations conducted in other vapor processing sub-zones are similar to what have been described. Again, this system may also be used in a Type 2 application by introducing the minor modifications described in connection with the general system of FIG. 3.

It is noted that, in a system of FIG. 6, generation of the second vapor in each vapor generation sub-zone is conducted intermittently. It is also noted that, in this system, it is convenient to use an integrated vapor procesing conduit that it provided with a melt storage near the conduit and a wick structure for feeding the melt on the outer wall during the solvent vaporization step. Such an integrated conduit is illustrated by FIGS. 7-a and 7-b. FIG. 7-a and FIG. 7-b respectively illustrate a radial cross section and a side view of an integrated vapor processing conduit. It comprises a conduit 38 provided with wicking structures 39, 40 and a melt storage trough 41 tht stores the melt 42. The region between the conduit and the trough may be separated into conpartments by partitions 43. A thin layer of melt is maintained on the outer wall of the conduit during melting and vaporization steps by the action of the wicking structure. Many types of wick structures and many materials have been used in manufacturing heat pipes. Such structures and materials are described in books on heat pipes, such as "Heat Pipe Theory and Practice", written by S. W. Chi and Published by Mc Graw/Hill Company and "Heat Pipes" written by P. Dunn and D. A. Reay and published by Pergamon Press. Wick structures and materials used in heat pipes can be used in the manufacture of integrated vapor processing conduits. The purpose of the wick structure in a vapor processing conduit are threefold: (1) to provide the necessary flow passages for transferring melt from the storage to all over the outer wall of the conduit, (ii) to provide surface pores at the liquid-vapor interface for the development of capillary pumping pressure, and (iii) to provide a heat flow path from the outer wall to the liquid-vapor interface. Some examples of wick structures are wrapped screen, sintered metal, circumferential grooves, screen covered circumferential grooves, and fabric and paper.

The system illustrated by FIG. 8 shows yet another modification of the general system of FIG. 3. A plant of this type can be used for conditioning sludges. The system comprises one or more freezing-thawing zones 44a, 44b, a vapor liquefaction zone 45, a vapor generation zone 46. In this system, there is no crystal washing zone. Each of the freezing-thawing zone is alternately used as a vacuum freezing zone and a crystal thawing zone. The vapor liquefaction zone 45 comprises several sub-zones 45a, 45b, 45c, 45d, each of which is used alternately as a vapor desublimation sub-zone and a desublimate-melting sub-zone. The operations in these sub-zones are conducted out-of-phase.

Under the condition illustrated in FIG. 8, a sludge is subjected to a vacuum freezing operation in the first freezing-thawing zone 44a and frozen sludge is thawed in the second freezing-thawing zone 44b. The functions of these two zones are alternated cyclically. The first vapor that is alternately generated in the two freezing-thawing zones is introduced into the vapor liquefaction sub-zones and the resulting desublimate is melted in the sub-zones. Second vapor is generated continuously in the vapor generation zone 46 and is alternately introduced into the first and second freezing-thawing zones to melt the crystals therein. The vapor liquefaction sub-zones 45a, 45b, 45c, 45d are provided with first valving means 47a, 47b, 47c 47d and second valving means 48a, 48b, 48c, 48d to control the flows of the first and second vapors into the sub-zones. By alternative actuations of these valves, desublimation of the first vapor and melting of the desublimate take place alternatively in each of the sub-zones. The flow of the second vapor into the two freezing-thawing zones is controlled by two gates 49a, 49b.

The operations conducted in the first sub-zone 45a are as follows:

used for a Type 2 process by introducing the minor modifications described in connection with the general system of FIG. 3.

Figure 13:
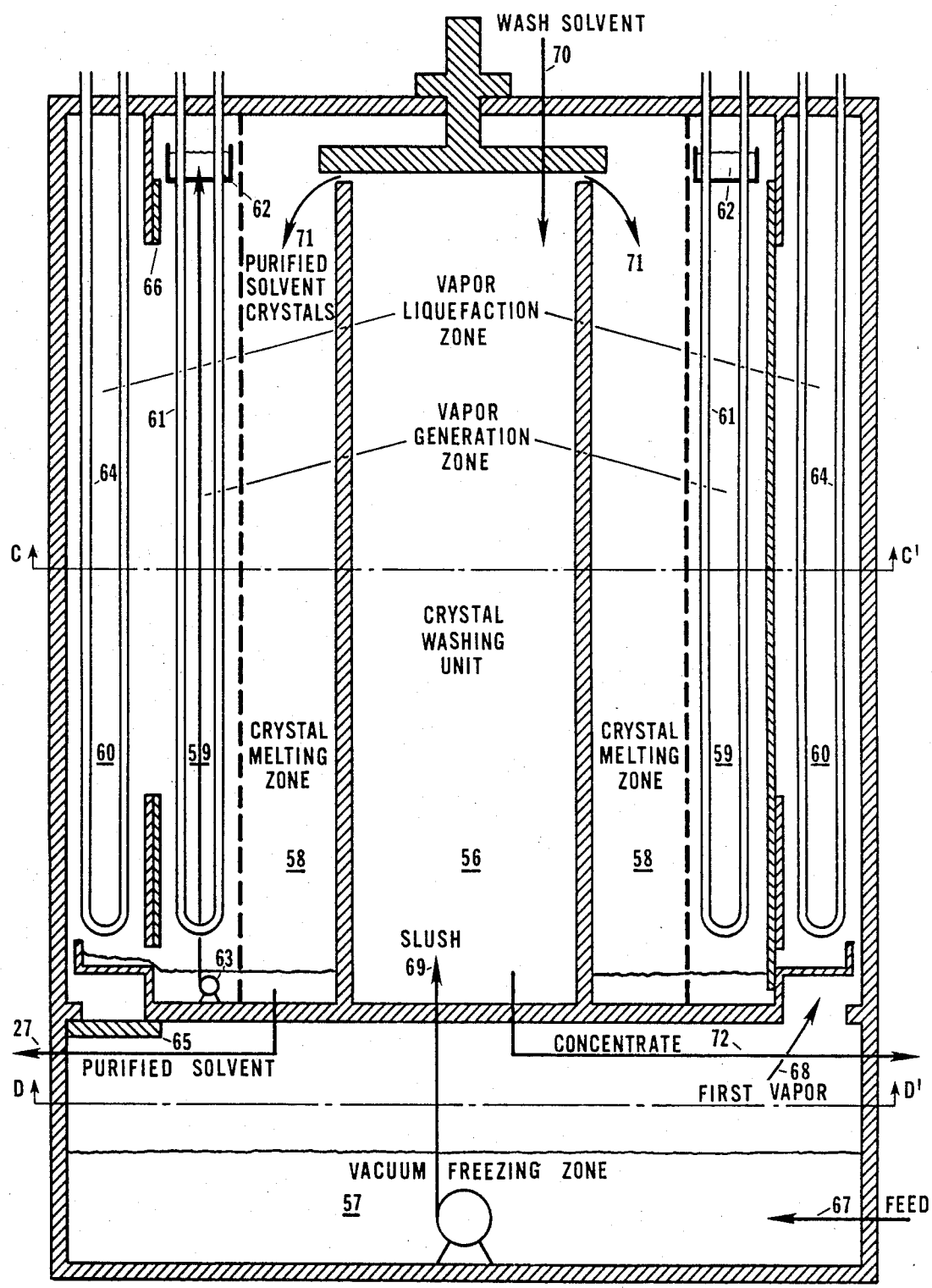
FIG. 13 illustrates another plant in which the processing zones are arranged according to the plan of FIG. 5. There is a cylindrical enclosure having an upper part and a lower part. All the processing zones including the crystal washing zone are included within the cylindrical enclosure: a vacuum freezing zone occupies the lower part of the unit; a crystal washing zone is at the center of the upper part; a crystal melting zone occupies the first annulus region surrounding the crystal washing zone; a vapor generation zone occupies the second annulus region that surrounds the crystal melting zone; a vapor liquefaction zone comprising several sub-zones occupies the third annulus region that surrounds the vapor generation zone. There is a first valving means controlling the flow of the first vapor from the vacuum freezing zone to the vapor liquefaction sub-zones; there is a second valving means controlling the flow of the second vapor from the vapor generation zone to the vapor liquefaction sub-zones.

FIGS. 13, 14a and 14b illustrates another plant with the zone arrangement of FIG. 5. This plant is similar to the plant of FIG. 11 except that the crystal washing zone 56 has been moved to the center region of the main processing unit. FIG. 13 illustrates a vertical cross section of the unit and FIGS. 14a and 14b show horizontal cross sections taken at positions C—C' and D—D' shown in FIG. 13. A vacuum freezing zone 57 is at the lower part of the unit, and remaining zones and subzones occupy the upper part of the unit: a crystal washing zone 56 is at the center; a crystal melting zone 58 is in the annulus space surrounding the crystal washing zone; a vapor generation zone 59 is in the annulus space surrounding the crystal melting zone; vapor liquefaction sub-zones 60a through 60f that are used for desublimation of the first vapor and melting the desublimate are in the outer annulus space that surround the vapor generation zone. There is a first valving means 65 that controls the flow of the first vapor from the vacuum freezing zone into the vapor liquefaction sub-zones 60 and there is a second valving means 66 that controls the flow of the second vapor from the vapor generation zone into the vapor liquefaction sub-zones 60. The operations of this plant is similar to the operations of the plant of FIG. 11, and the plant may also be used in a Type 2 application.

An improved VFMPT Plant has many advantages over conventional vacuum freezing processes. These advantages are as follows:

(1) CORROSION PROBLEMS HAVE BEEN ELIMINATED

In the improved VFMPT plant, there are a thin film evaporator in the vapor generation zone and heat exchangers in the vapor liquefaction sub-zones. These units are in contact only with purified solvent. For example, in case of a desalination plant, only pure water ever gets in contact with the evaporator and heat exchangers. Therefore, there is no corrosion problem and inexpensive material such as extruded aluminum, steel, and copper can be used in constructing these units. It is noted that, in some conventional vacuum freezing processes, a concentrated lithium bromide solution, a concentrated sodium hydroxide solution, and a concentrated sodium chloride solution are used to absorb the first vapor formed in a vacuum freezing operation. Because of the corrosive nature of these solutions, an expensive metal had to be used in constructing the heat exchangers in these processes.

(2) A LOW PRESSURE COMPRESSOR HAS BEEN ELIMINATED

In the improved VFMPT plant, a closed cycle heat pump utilizing a refrigerant such as Freon 12 and Freon 22 is used to remove heat from the desublimation sub-zones and supply heat to the vaporization zone. Such a heat pump is a conventional refrigeration unit that is available commercially. There is no need for a low pressure compressor. It is noted Colt Industries had tried many years in developing the low pressure compressor needed in its Vacuum Freezing Vapor Compression process and failed in developing a successful compressor.

(3) PARTS USED ARE COMMONLY AVAILABLE

Most of the parts used in an improved VFMPT Process are commonly available and do not require extensive development work for their fabrications. Vacuum vessels, heat exchangers, thin film evaporators, crystal washing columns, crystal melters, first and second valving means are used in the improved VFMPT Process. All of these parts are commonly available. It is noted that extensive development work has gone into each of the conventional vacuum freezing processes, and yet none has become a commercially successful process.

(4) RATES OF THE MAJOR OPERATIONS INVOLVED ARE HIGH

The major operations involved in the improved VFMPT Process are the vacuum freezing operation, the first vapor desublimation operation, the desublimate melting operation, the second vapor generation operation, and the crystal melting operation. All of these operations take place at high rates. The rates of these operations are described as follows:

(a) Vacuum Freezing

An evaporative freezing operation in the VFVC Process is conducted in a highly agitated freezer that is maintained uner a high vacuum condition. The high vacuum condition (3.4 mm Hg) in the freezer causes the feedwater to flash, forming a pure water vapor. Extraction of the latent heat of fusion from the feed results in a partial freezing of the brine, leading to the formation of ice crystals. An agitator is located within the freezer. Colt Industries has used the following equation to describe the performance of an evaporative freezing operation in a freezer:

$$Q_f = h_f A_f \Delta t_f$$

were $Q_f$ is the rate of heat transfer in Btu/hr, $A_f$ is taken as the cross-sectional area of the freezer, and $h_f$ is the heat transfer coefficient in Btu/hr·ft$^2$·°F. In operations using a current agitator, typical values of these parameters are:

$h_f = 18,000$ Btu/hr·ft$^2$·°F.

$\Delta t_f = 2$° F.

From the information above, it is seen that the vacuum freezing operation takes place at a high rate and a small driving force can be used in the operation. Other types of freezers are also available.

(b) Desublimation of the First Vapor

The major resistance to the desublimation of the first vapor is the resistance due to the deposited layer of desublimate itself. Under a proper operation, this heat transfer resistance is small. The reasons are as follows:

(i) High Latent Heat of Sublimation

In case of water, the latent heat of sublimation is very high, 1214 Btu/lb. This means that only one pound of ice is deposited on the heat exchanger surface as 1214 Btu of heat is removed. Therefore, the rate of desublimate build-up is small.

(ii) High Thermal Conductivity of Ice

The thermal conductivity of a smooth ice deposit is $5.7 \times 10^{-3}$ cal/sec·cm$^2$·(°C./cm), which is about 4.4 times of that of water.

It has been estimated that the equivalent average heat transfer coefficient for a properly conducted desublimation operation is higher than 500 Btu/hr·ft$^2$·°F.

(c) Desublimate Melting

It has been described that a desublimate melting operation may be accomplished by bringing a second vapor in contact with the desublimate. This operation has been illustrated by FIGS. 9-a through 9-c. When a second vapor 50 is brought in contact with the desublimate 51 on a solid surface 52, simultaneous condensation and melting take place. Heat transfer rate in this operation is high, because there is only a thin liquid film separating the region where the second vapor condenses (the heat source) and the region where the desublimate melts (the heat sink).

(d) Generation of the Second Vapor

A thin film evaporator is used in generating the second vapor. It is well known that a high heat transfer rate can be obtained in a thin film evaporator. It is important to note that, one pound of the second vapor is generated as 1070 BTU of heat is passed through the evaporator, and the one pound of the second vapor can melt 7.5 pounds of purified ice, producing 8.5 pounds of fresh water. Therefore, the amount of heat transferred in the evaporator in producing one pound of water from the plant is only $1070 \div 8.5 = 125.9$ BTU/pound. Because of the high heat transfer rate and because of the small amount of heat needed to be transferred, the size of the thin-film evaporator needed for a given production capacity is very small.

(e) Crystal Melting

Rate of melting ice crystals by a water vapor at a pressure slightly higher than the triple point pressure has been studied extensively by Colt Industries, Concentration Specialists, and MIT. The results obtained by all these studies show that ice melting by direct contact heat transfer from a water vapor is very fast.

(5) SIMPLE CONSTRUCTION OF AN IMPROVED VFMPT PLANT

Plants designed according to the processing zone arrangments illustrated in FIGS. 5 and 8, in particular, are very simple in constructions. Such plant designs have been explained earlier by referring to FIGS. 11 through 14.

Because of the reasons summarized above, an improved VFMPT plant can be constructed at a low cost, and can be operated simply and reliably.

Terminologies used in the claims to be presented are defined and explained as follows:

(1) SINGLE FUNCTION AND MULTIPLE FUNCTION ZONES (SUB-ZONES)

A zone or a sub-zone in which an operation is conducted continuously or substantially continuously without shifting its function is called a single function zone or sub-zone. Examples are as follows: the vacuum freezing zones in FIGS. 3, 4, 5, 6, 11 and 13 are single function zones; the combined melting zone of FIG. 4 and the crystal melting zones in FIGS. 3, 5, 6, 11 and 13 are single function zones; the vapor generation zones in FIGS. 3, 4, 5, 8, 11 and 13 are single function zones. It is noted that the combined melting zone in FIG. 4 is called a single function zone even though both crystal melting operation and desublimate melting operation take place therein, because the two operations are similar operations and the operations take place simultaneously and at least substantially continuously and there is no shifting of the function in the zone.

A zone or a sub-zone is called a double function zone or sub-zone when two distinct operations are alternately and cyclically conducted in the zone or subzone. Examples are as follows: the vapor liquefaction sub-zones in FIGS. 5, 8, 11 and 13 are double function sub-zones, because a vapor desublimation operation and a desublimate melting operation are alternately and cyclically conducted in each of these sub-zones; a sludge freezing and melting zone in FIG. 8 is a double function zone, because a sludge freezing operation and a sludge thawing operation are alternately and cyclically conducted in the zone.

Similarly, a zone or sub-zone is called a triple function zone or sub-zone when three distinct operations are successively and cyclically conducted in the zone or sub-zone. For example, a vapor processing sub-zone in FIG. 6 is a triple function sub-zone, because a vapor desublimation operation, a desublimate melting operation and vapor generation operation are successively and cyclically conducted therein. Double and triple function zones and sub-zones are respectively referred to as multiple function zones and sub-zones.

(2) CONTINUOUS OR SUBSTANTIALLY CONTINUOUS OPERATIONS

In an improved VFMPT plant, operations conducted in most zones and some sub-zones are either substantially or completely continuous. An operation that is operated continuously for more than 75% of the time and pausing for less than 25% of the time is defined to be a substantially continuous operation. An operation that is operated continuously for more than 90% of the time and pausing for less than 10% of the time is defined as a nearly continuous operation. An operation that can be operated completely continuously can always be operated substantially continuously or nearly continuously. Continuous or substantially continuous operations in most processing zones of an improved VFMPT plant are emphasized in order to distinguish from bachwise operations.

By a continuous or substantially continuous removal of the first vapor generated, the vacuum freezing operations conducted in each of the vacuum freezing zones of FIGS. 3, 4, 5, 8, 11 and 13 can be conducted continuously or substantially continuously. The vapor generation operation conducted in each of the vapor generation zones in FIGS. 3, 4, 5, 8, 11 and 13 can be conducted continuously. With continuous or substantially continuous supplies of the second vapors, operations conducted in the crystal melting zones of FIGS. 3, 5, 8, 11 and 13 and in the combined melting zone of FIG. 4 are continuous or substantially continuous. These zones may be referred to as continuously or substantially continuously operated zones. Operations conducted in the vapor desublimation sub-zone and desublimate melting sub-zone of FIG. 3 and in the vapor desublimation sub-zone of FIG. 4 may be conducted continuously. These sub-zones are continuously operated sub-zones. Operations in any multiple function zone or sub-zone is not continuous.

In the system illustrated by FIG. 6, the operations conducted in the vacuum freezing zione and the crystal melting zone may either be continuous or substantially continuous. Continuous operations in these zones can be achieved when there are more than three vapor processing sub-zones. When there are only two vapor processing sub-zones, removal of the first vapor and supply of the second vapor may only be substantially continuous. Let the time taken in the desublimation step in a sub-zone be $\theta_1$, the time taken in the desublimate melting step be $\theta_2$, and the time taken in the vapor generation step be $\theta_3$. The time taken to complete a cycle is $\theta_1+\theta_2+\theta_3$. Since a heat pump is used to remove heat during a desublimation step and the heat is upgraded and supplied during the desublimate melting and vapor generation steps, $\theta_1$ is equal to the sum of $\theta_2$ and $\theta_3$. When there are two similar vapor processing sub-zones, the fraction of a cycle time during which the first vapor is removed by the vapor processing zone is $2\theta_1/(\theta_1+\theta_2+\theta_3)$, and the fraction of a cycle time during which the second vapor is generated by the vapor processing zone is $2\cdot\theta_3/(\theta_1+\theta_2+\theta_3)$. For example, $\theta_1$, $\theta_2$ and $\theta_3$ may be respectively 50%, 12.5% and 37.5% of a cycle time. Then, the vacuum freezing operation may be operated nearly 100% continuously and the crystal melting operation be operated nearly 75% continuously. In order to provide a quantitative measure in defining a substantially continuous operation, an operation that is operated continuously for more than 75% of the time and pausing for less than 25% of the time is defined to be a substantially continuous operation.

Figure 11:
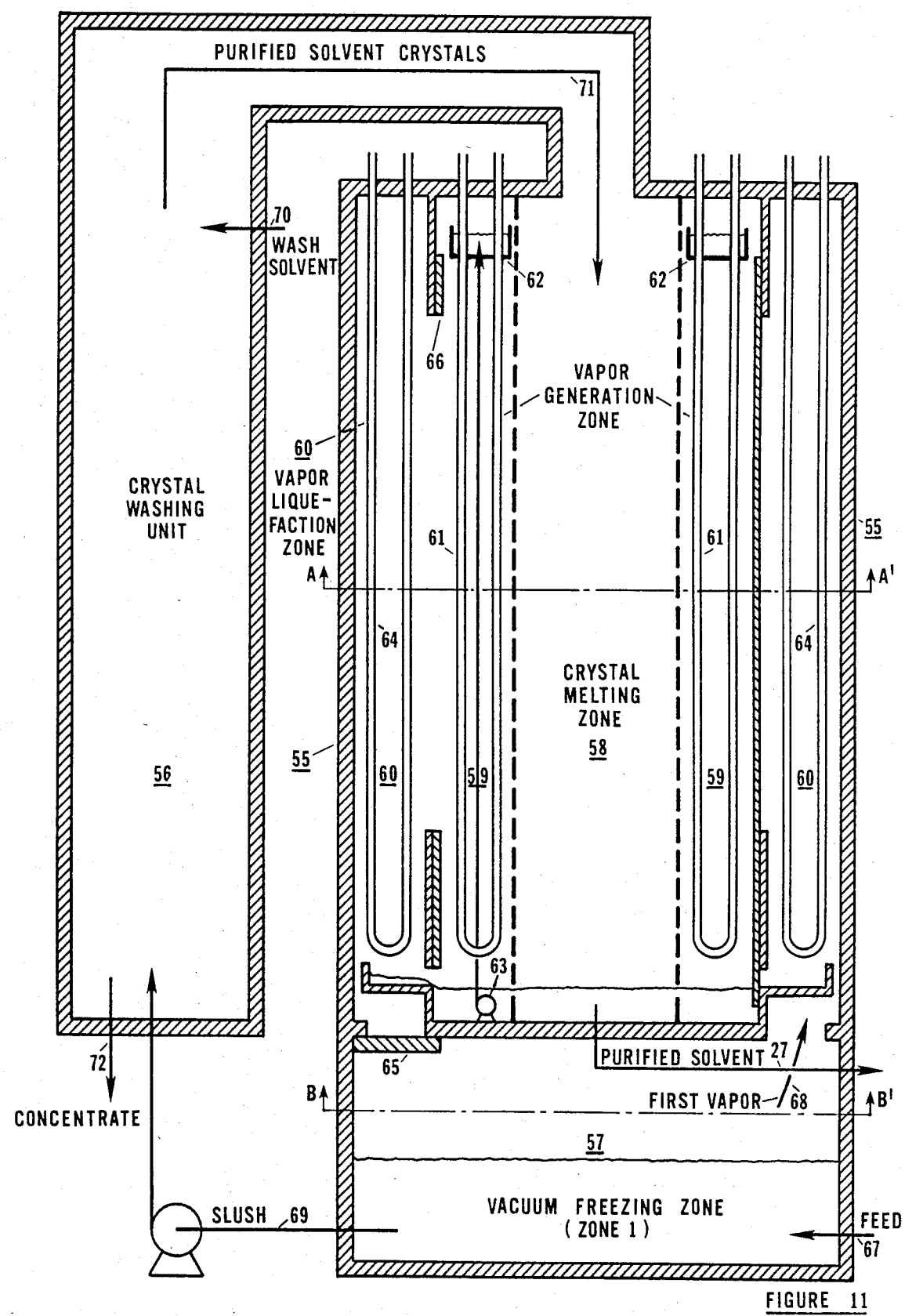
FIG. 11 illustrates a plant in which the processing zone are arranged according to the plan of FIG. 5. It has a main processing unit and a crystal washing unit. The main processing unit has a cylindrical enclosure having an upper part and a lower part. A vacuum freezing zone is at the lower part; a crystal melting zone is at the center of the upper part; a vapor generation zone having a vertical thin-film evaporator therein occupies the annulus space surrounding the crystal melting zone; a vapor liquefaction zone comprising several sub-zones occupies the outer annulus region surrounding the vapor generation zone. There is a first valving means controlling the flow of first vapor from the vacuum freezing zone to the vapor liquefaction sub-zones; there is a second valving means controlling the flow of second vapor from the vapor generation zone to the vapor liquefaction sub-zones.

It has been described that plants illustrated by FIGS. 11 and 13 have zone arrangement illustrated by FIG. 5. Such plants can be conveniently used for both Type 1 and Type 2 applications. In such a plant the vacuum freezing zone, the vapor generation zone, the crystal melting zone and the crystal washing zone are single function zones and operations in these zones can be conducted continuously. That there are several vapor liquefaction sub-zones make it possible to remove the first vapor from the vacuum freezing zone continuously. A plant with zone arrangement of FIG. 5 has advantage in not requiring an expensive equipment for a scraped surface heat exchanger and is yet able to have most of the zones operated continuously.

What we claim are as follows:

1. A process of subjecting a mixture containing a volatile solvent and at least one low volatility component to freezing and melting operations that comprises the following steps:
   (a) A vacuum freezing step of flash vaporizing feed mixture in a vacuum freezing zone to form a first vapor and a first condensed mass containing solvent crystals and the remaining mass, the pressure of the first vapor being lower than the triple point pressure of the solvent;
   (b) A two stage vapor liquefaction step of transforming thr first vapor into solvent liquid in a vapor liquefaction zone comprising at least one vapor desublimation sub-zone and at least one desublimate melting sub-zone involving (i) a sub-step of desubliming the first vapor to form a desublimate mass in the vapor desublimation sub-zone by introducing the first vapor into the sub-zone and removing heat therefrom and (ii) a sub-step of melting a mass of the desublimate in the desublimate melting sub-zone by locating the desublimate in the sub-zone and supplying heat thereto, the melt of the desublimate being solvent liquid;
   (c) A vapor generation step of transforming a mass of solvent liquid into a second vapor in a vapor generation zone by supplying heat thereto, the pressure of the second vapor being somewhat higher than the triple point pressure of the solvent;
   (d) A crystal melting step of bringing the second vapor in contact with solvent crystals derived from the first condensed mass in a crystal melting zone to thereby melt the crystals and condense the vapor;

wherein all of the latent heat required in melting the solvent crystals is providable by the latent heat released in condensing the second vapor, and wherein the vacuum freezing zone and the crystal melting zone are separate and are both single function zones and the two stage vapor liquefaction step and the vapor generation step are so operated to respectively remove the first vapor and supply the second vapor at least substantially continuously, allowing the vacuum freezing step and the crystal melting step to be conducted at least substantially continuously.

2. A process of claim 1 wherein the vacuum freezing step, the vapor generation step and the crystal melting step are conducted at least nearly continuously.

3. A process of claim 1 or 2, wherein a part of the second vapor is brought in contact with at least a major part of the desublimate to thereby melt the desublimate and condense the second vapor, both the melt of the desublimate and the condensate being solvent liquid.

4. A process as in any claims 1 through 3, wherein the vapor liquefaction zone and the vapor generation zone are combined into a vapor processing zone having more than one vapor processing sub-zones, in each of which a vapor desublimation step, a desublimate melting step and vapor generation step are successively and cyclically conducted.

5. A process as in any of claims 1 through 3, wherein the vapor generation zone and the vapor liquefaction zone are separate zones, the vapor generation zone is a single function zone, and the vapor liquefaction zone comprises more than one sub-zone, in each of which a vapor desublimation operation and a desublimate melting operation are alternately and cyclically conducted.

6. A process as in any of claims 1 through 5, which further comprises a step of separating the first condensed mass into a mass of purified solvent cyrstals and a concentrate, the purified solvent crystals being melted in the crystal melting step to become purified solvent liquid.

7. A process as in any of claims 1 through 6, wherein the solvent of the mixture is water.

8. A process as in any of claims 1 through 6, wherein the solvent of the mixture is a non-aqueous solvent.

9. A process as in any of claims 1 through 5, wherein the feed is chosen from a group that comprises municipal waste water sludge, aqueous gelatinous substances, industrial waste sludge and organic gels, and wherein the crystal melting step is conducted by bringing the second vapor in direct contact with the first condensed mass obtained in the vacuum freezing step.

10. A process of conditioning a feed mixture that is chosen from a group that comprises municipal waste water sludge, aqueous gelatinous substances, industrial waste sludge and organic gels through freezing and thawing operations that comprises the following steps:

(a) A vacuum freezing step of flash vaporizing feed mixture in a vacuum freezing zone to form a first vapor and a first condensed mass containing solvent crystals and the remaining mass, the pressure of the first vapor being lower than the triple point pressure of the solvent;

(b) A two stage vapor liquefaction step of transforming the first vapor into solvent liquid in a vapor liquefaction zone comprising at least one vapor desublimation sub-zone and at least one desublimate melting sub-zone involving (i) a sub-step of desubliming the first vapor to form a desublimate mass in the vapor desublimation sub-zone by introducing the first vapor into the sub-zone and removing heat therefrom and (ii) a sub-step of melting a mass of the desublimate in the desublimate melting sub-zone by locating the desublimate in the sub-zone and supplying heat thereto, the melt of the desublimate being solvent liquid;

(c) A vapor generation step of transforming a mass of solvent liquid into a second vapor in a vapor generation zone by supplying heat thereto, the pressure of the second vapor being somewhat higher than the triple point pressure of the solvent;

(d) A crystal melting step of bringing the second vapor in contact with solvent crystals derived from the first condensed mass in a crystal melting zone to thereby melt the crystals and condense the vapor;

wherein all of the latent heat required in melting the solvent crystals is providable by the latent heat released in condensing the second vapor.

11. A process of claim 10, wherein there are more than one freezing-thawing zones, each of which is alternately and cyclically used as a vacuum freezing zone and a crystal melting zone.

12. A process of claim 10 or 11, wherein the vapor generation zone and the vapor liquefaction zone are separate zones, the vapor generation zone is a single function zone, and the vapor liquefaction zone comprises two or more sub-zones, in each of which a vapor desublimation operation and a desublimate melting operation are alternately and cyclically conducted.

13. A system for subjecting a mixture that contains a volatile solvent and at least one low volatility component to freezing and melting operations that comprises a vacuum freezing chamber, a vapor liquefaction chamber, a vapor generation chamber containing a solvent evaporator therein, a crystal melting chamber, the said vapor liquefaction chamber comprising at least a vapor desublimation chamber having a heat exchanger therein and at least a desublimate melting chamber, a first vapor passage for admitting a first vapor from the vacuum freezing chamber to the vapor desublimation chamber, a second vapor passage for admitting a second vapor from the vapor generation chamber to the crystal melting chamber, a first transport means for transporting solvent crystals from the vacuum freezing chamber to the crystal melting chamber, a solvent distributor for distributing solvent liquid on the surface of the solvent evaporator in the vapor generation chamber, wherein the mixture is subjected to the following operational steps:

(a) A vacuum freezing step of flash vaporizing feed mixture in the vacuum freezing chamber to form a first vapor and a first condensed mass containing solvent crystals and the remaining mass, the pressure of the first vapor being lower than the triple point pressure of the solvent;

(b) A two stage vapor liquefaction step of transforming the first vapor into solvent liquid in the vapor liquefaction chamber involving (i) a sub-step of desubliming the first vapor to form a desublimate mass in the vapor desublimation chamber by introducing the first vapor through the first vapor passage into the chamber and removing heat through the heat exchanger therein and (ii) a sub-step of melting a mass of the desunlimate in the desublimate melting chamber by locating the desublimate in the chamber and supplying heat thereto, the melt of the desublimate being solvent liquid;

(c) A vapor generation step of transforming a mass of solvent liquid into a second vapor in a vapor generation zone by supplying heat to the solvent evaporator therein, the pressure of the second vapor being somewhat higher than the triple point pressure of the solvent;

(d) A crystal melting step of bringing the second vapor in contact with solvent crystals derived from the first condensed mass in a crystal melting chamber to thereby melt the crystals and condense the vapor;

wherein all of the latent heat required in melting the solvent crystals is providable by the latent heat released in condensing the second vapor, and wherein the vacuum freezing chamber and the crystal melting chamber are separate chambers and both form single function zones and the two stage vapor liquefaction step and the vapor generation step can be so operated to respectively remove the first vapor and supply the second vapor at least substantially continuously, allowing the vacuum freezing step and the crystal melting step to be conducted at least substantially continuously.

14. A sytem of claim 13, which further comprises a third vapor passage for admitting a part of the second vapor into the desublimate melting chamber to melt the desublimate therein.

15. A system of claim 13 or 14, wherein the vapor liquefaction chamber and vapor generation chamber are combined into a vapor processing chamber that has more than two sub-chambers, each of which is usable successively and cyclically as a vapor desublimation chamber, a desublimate melting chamber and a vapor generation chamber.

16. A system of claim 13 or 14, wherein the vapor generation chamber and the vapor liquefaction chamber are separate chambers, the vapor generation chamber forms a single function zone, and the vapor liquefaction chamber comprises two or more sub-chambers, each sub-chamber being usable alternately and cyclically as a vapor desublimation chamber and a desublimate melting chamber, a first valving means for controlling the flow of the first vapor from the vacuum freezing chamber to each vapor liquefaction sub-chamber and a second valving means for controlling the flow of the second vapor from the vapor generation chamber to each vapor liquefaction sub-chamber.

17. A system as in any of claims 13 through 16, which further comprises a crystal washing unit provided within the said first transport means.

18. An apparatus of the system of claim 16 having an enclosure that has a lower part and an upper part for enclosing at least the vacuum freezing chamber, the crystal melting chamber, the vapor generating chamber and the vapor liquefaction sub-chambers, wherein the vacuum chamber occupies the lower part of the enclosure, the crystal melting chamber occupies a first region that is either the central region or close to the central region of the upper part, the vapor generation chamber occupies a second region that surrounds the first region, the vapor liquefaction sub-chambers occupy a third region that surrounds the second region, the first valving means that control the flow of the first vapor being provided in a first interfacial region between the vacuum freezing chamber and the vapor liquefaction sub-chambers and the second valving means that control the flow of the second vapor being provided in a second interfacial region between the said second region and the said third region.

19. An apparatus of claim 18, wherein a crystal washing unit is installed in the central or near central region that is inside of the said first region.

20. A system for conditioning a mixture containing a volatile solvent and at least one low volatility component through freezing and thawing operations that comprises two or more freezing-thawing zones, a vapor liquefaction zone and a vapor generation zone, the vapor generation zone being a single function zone, the vapor liquefaction zone having more than two sub-zones, and each of the freezing-thawing zone being used alternately and cyclically as a vacuum freezing zone and a crystal melting zone, a first valving means for controlling the flow of first vapor generated in a vacuum freezing zone to each of the vapor liquefaction sub-zones and a second valving means for controlling the flow of a second vapor generated in the vapor generation zone to a crystal melting zone and a third valving means for controlling the flow of a part of the second vapor to each of the vapor liquefaction sub-zones.

* * * * *